Sept. 2, 1969  N. J. McNALLY  3,464,584

BAFFLE DEVICE

Filed May 1, 1967

NORBERT J. McNALLY
*INVENTOR.*

BY *Lawrence J. Bryhainin*

ATTORNEY

United States Patent Office

3,464,584
Patented Sept. 2, 1969

3,464,584
BAFFLE DEVICE
Norbert J. McNally, 151 Brayton Road,
Boston, Mass. 02135
Filed May 1, 1967, Ser. No. 635,212
Int. Cl. B65d 3/00
U.S. Cl. 220—86                                    5 Claims

ABSTRACT OF THE DISCLOSURE

A baffle device, installed internally within a commercial or domestic oil storage tank, to divert the stream of incoming oil away from the bottom of the tank and instead towards the sides. This device deflects the incoming oil, yet does not slow or impede the flow of fuel into the tank nor does it develop any back pressure on the pump delivering to the fuel.

Background of the invention

This invention relates to oil storage tanks and more particularly to a baffle device for use in an oil storage tank to prevent the incoming oil from eroding a portion of the tank.

In fuel oil storage devices, such as metal tanks that are commonly utilized at industrial installations, as well as those fuel oil storage tanks that are used at domestic heating installations, there exists a problem that is common to both storage units namely: erosion at the bottom of the tanks. Obviously, this is a highly undesirable situation because the erosion process starts at the inside of the tank and works its way outwardly giving the owner little if any advance warning of the impending leak.

An investigation of this situation indicates that the erosion process is the most rapid at that point immediately below the inlet pipe, indicating that the pressurized flow of oil, impinging on a relatively small area of the inner surface of the tank, causes the metal to erode at a much higher rate than any other part of the tank. It is therefore proposed, in this application, that a baffle device be inserted at a predetermined point between the pressurized, incoming flowing oil stream and the opposite wall of the tank to minimize the erosion brought about by the incoming, pressurized flowing oil. In any event it is noticeably less expensive and considerably more convenient to replace the eroded baffle than it would be to replace the tank.

Summary of the invention

In my device a baffle plate is suspended at a point below the inlet port of the tank, in the path of the incoming stream of the oil, as it is pumped into the tank. By suspending the baffle at the end of supporting rods, I have found that by utilizing a standard nipple, in association with a standard coupling, I am able to provide a baffle which is both easily insertable as well as removable and will prevent the erosion of the storage tank at a point directly opposite the inlet port.

It is, therefore, a principal object of the present invention to provide a novel baffle device to prevent the erosion of an interior portion of a storage tank.

Another principal object of the present invention is to provide an easily removable and replaceable novel baffle device to prevent the erosion of the interior portion of a storage tank.

Still another principal object of the present invention is to interpose a baffle device between the inlet port and one of the inner sides of an oil storage tank wherein the baffle portion may be shaped to direct the flow in a given direction.

A further principal object of the present invention is to interpose a baffle device between the inlet port and one of the inner sides of an oil storage tank that will not develop any back pressure on the pump.

The features of any invention I believe to be novel are set forth with particularity in the appended claims. My invention itself, however, both as to its organization and method of operation, together with further objects and advances thereof, may be best understood by reference to the following description, taken in conjunction with the accompanying drawings, in which:

Description of the preferred embodiments

Figure 1:
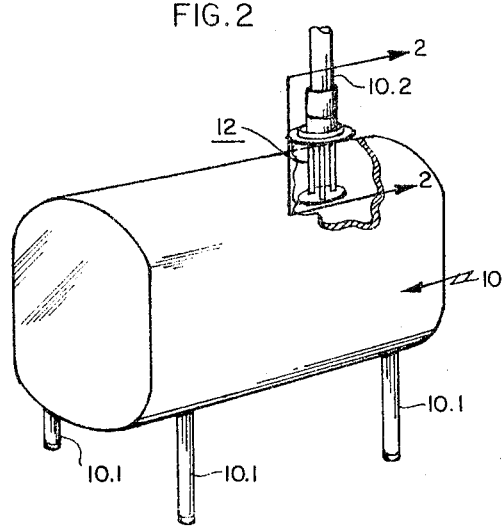
FIG. 1 is a perspective view, partially in section, of an oil storage tank utilizing my device.

Referring now to FIG. 1 there is shown, partially in section, an oil storage tank 10 with my novel device 12 mounted therein. In a typical installation, tank 10 is mounted on legs 10.1. The oil (not shown) is discharged into the tank by means of inlet filler pipe 10.2, affixed to the tank by means of a coupling and nipple assembly.

Figure 4:
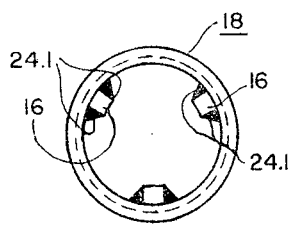
FIG. 4 is a plan view of my device as shown in FIG. 3.
Figure 3:
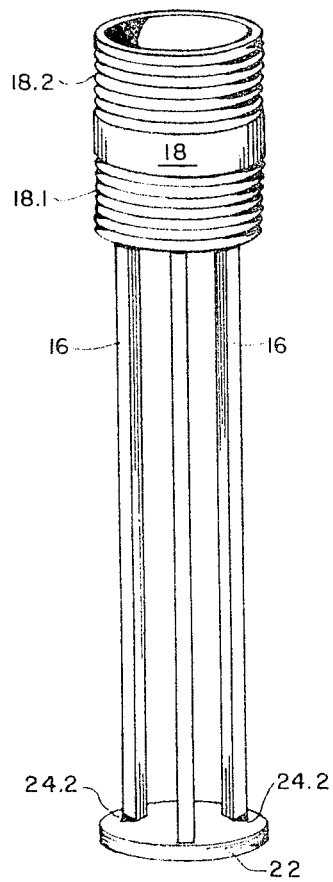
FIG. 3 is a perspective view of my novel device.
Figure 2:
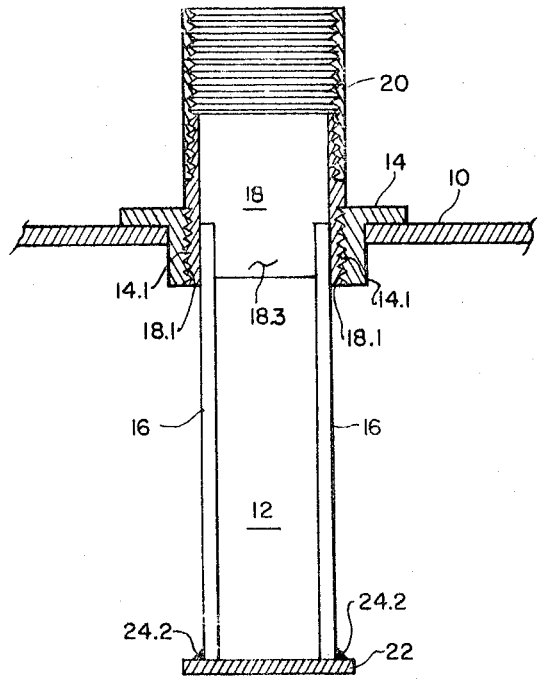
FIG. 2 is a sectional view, of my baffle device taken along lines 2—2 of FIG. 1.

Referring now of FIGS. 2, 3 and 4 for a description of the preferred embodiment, there is shown a flange 14 affixed to the upper portion of the tank 10 in the usual manner. The inner aperture of flange 14 is provided with a threaded portion 14.1 having the same diameter and the same pitch as the threads 18.1 on the lower portion of close nipple 18. A plurality of rods or support members 16, is welded 24.1 or otherwise suitably affixed to the inner surface 18.3 of close nipple 18, preferably equidistantly arranged about surface 18.3 of nipple 18. A flat baffle plate 22 is affixed by means of welds 24.2 to the other end of the rods or support members 16. The principal function of baffle plate 22 is to deflect the stream of incoming oil away from that portion of the tank immediately below the inlet port.

Close nipple 18 is further provided with a threaded portion 18.2 which may have the same diameter and pitch as the threaded portion 20.1 of coupling or union 20 so that the threaded portion of inlet filler pipe 10.2 (FIG. 1) may be mated with coupling 20 when my device is inserted in the tank.

It should be obvious, to those skilled in the art, that while only three rods or support members 16 are shown, there are other configurations that may be utilized. If so desired, the rods 16 may be bent inwardly to be joined at a point below the flange 14 and a single extension rod may be provided to which baffle plate 22 may be attached.

Similarly, while baffle plate 22 is shown as a plate or disc shaped member, it is possible to shape element 22 into, for example, a multi-faceted pyramid so that the oil is deflected in all directions. In this embodiment, baffle 22 may be a four-sided pyramid, affixed to the ends of rods or support members 16 as previously described.

It should be noted that, to eliminate any possibility of developing any back pressure on the pump delivering the fluid, one must take into consideration the rate of flow of fluid and the diameter of the pipe. It has been found that a typical fuel oil delivery and storage system will have a 1.5 inch or 2 inch inlet pipe. To prevent back pressure the rods 16 should be of sufficient length to maintain baffle 22 or 22.1 about 5 to 12 diameters below the inlet port. In which case, I have found that a spacing of about 12 inches is satisfactory for inlet pipes having inside diameters ranging from 1.5 inches to 2 inches.

While I have described what is presently considered the preferred embodiments of my invention, it will be obvious

What I claim is:

1. A fluid storage tank having a threaded inlet port and a mating, threaded inlet pipe thereto for filling the tank in combination with a baffle device, the baffle device comprising:
   a hollow cylindrical nipple member having the same diameter as the outside diameter of the inlet pipe;
   baffle means;
   spacer means disposed parallel to the longitudinal axis of the nipple member and extending between the nipple member and the baffle means to maintain the baffle means at a predetermined distance from the nipple member;
   the spacer means is a plurality of spacer bars, symmetrically disposed about and having one end thereof affixed to the inside surface of the nipple member;
   the other end of each spacer bar affixed to the baffle means, to maintain the said predetermined spacing.

2. The combination of claim 1 wherein:
   the predetermined spacing between the nipple member and the baffle means is maintained within a range between about 5D to about 12D; and
   D is the inside diameter of the inlet pipe.

3. The combination of claim 2 further comprising a threaded portion on the outer surface of the nipple member for mating with the threads of the inlet port, and
   an inside threaded, hollow, cylindrical collar member having the same inside diameter and thread pitch as the outside diameter of the inlet pipe, to interconnect the inlet pipe and the nipple member.

4. The combination of claim 3 wherein:
   the baffle means is a flat circular plate having at least the same diameter as the inside diameter of the inlet pipe.

5. The baffle device of claim 3 wherein the baffle plate is provided with a shaped upper portion to deflect the incoming fluid in a given direction.

References Cited

UNITED STATES PATENTS

| | | |
|---|---|---|
| 695,237 | 3/1902 | Scheuffgen. |
| 1,467,609 | 9/1923 | Cripe _____ 220—86 |
| 1,976,975 | 8/1934 | Williams _____ 220—86 |
| 2,602,465 | 7/1952 | Goehring _____ 220—86 XR |
| 3,288,321 | 11/1966 | Wokas. |

RAPHAEL H. SCHWARTZ, Primary Examiner